Dec. 15, 1931. F. TUTTLE 1,836,691
MEANS FOR MAINTAINING MOVING BANDS IN SYNCHRONISM
Filed Sept. 3, 1929 3 Sheets-Sheet 1
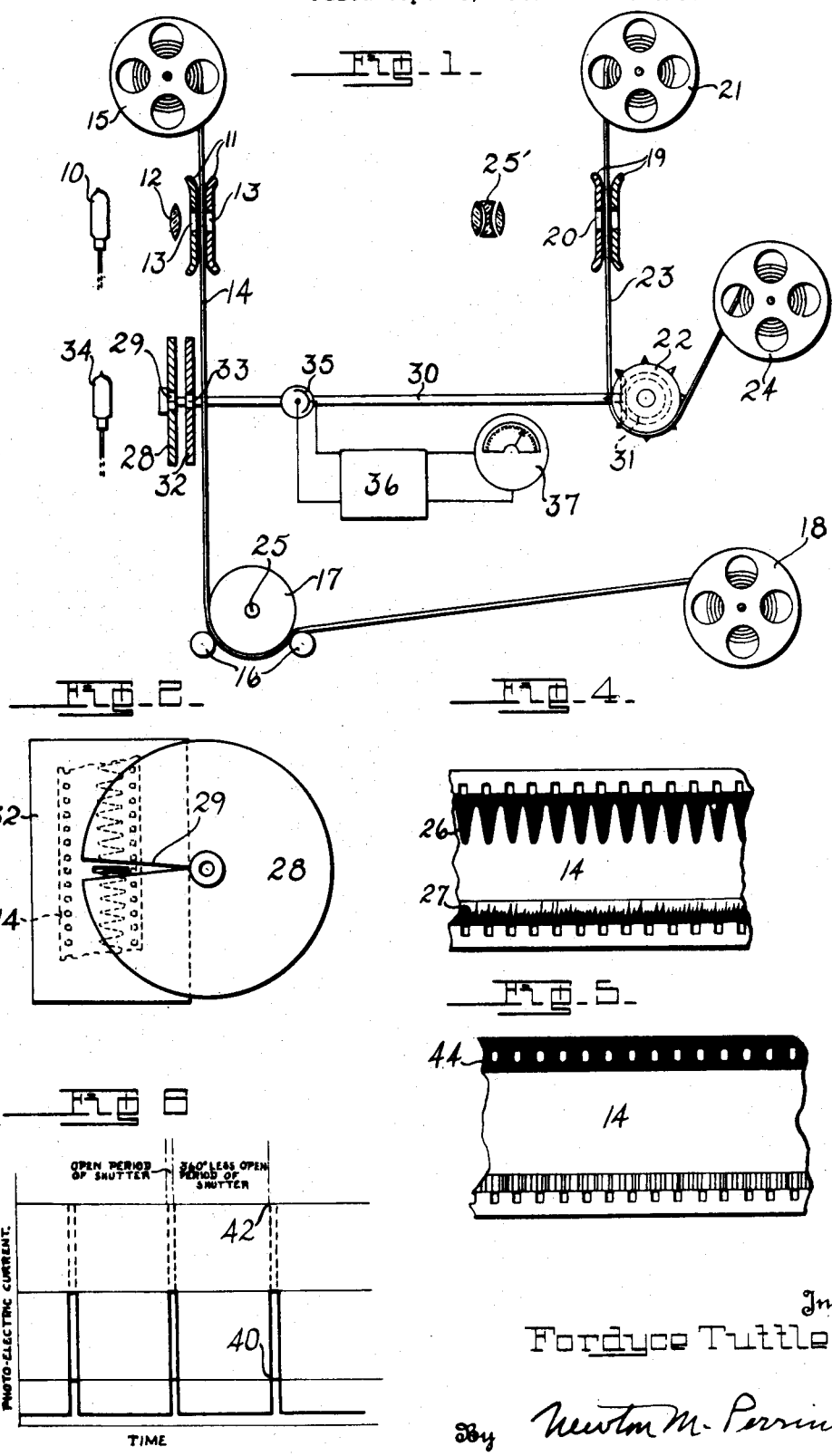

Dec. 15, 1931.         F. TUTTLE        1,836,691
MEANS FOR MAINTAINING MOVING BANDS IN SYNCHRONISM
Filed Sept. 3, 1929     3 Sheets-Sheet 2
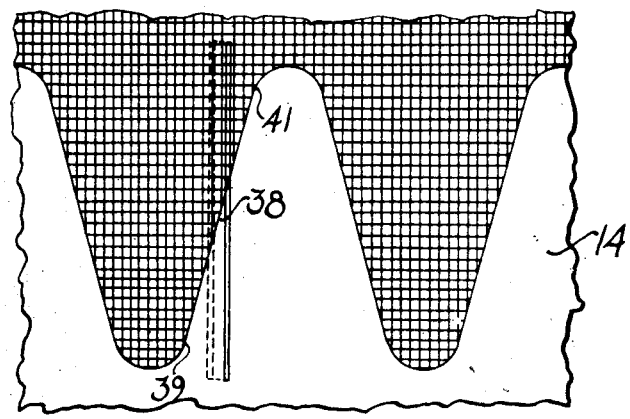
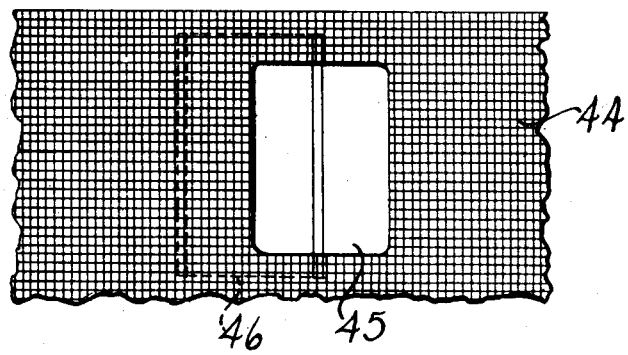
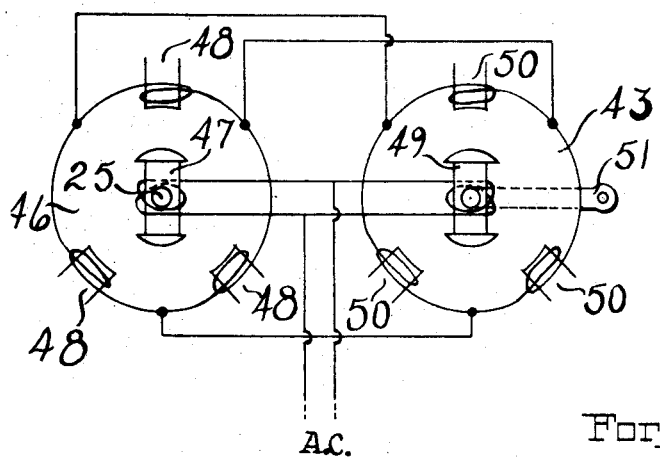
Inventor
Fordyce Tuttle
By Newton M. Perriss
Attorney Dec. 15, 1931.   F. TUTTLE   1,836,691
MEANS FOR MAINTAINING MOVING BANDS IN SYNCHRONISM
Filed Sept. 3, 1929    3 Sheets-Sheet 3
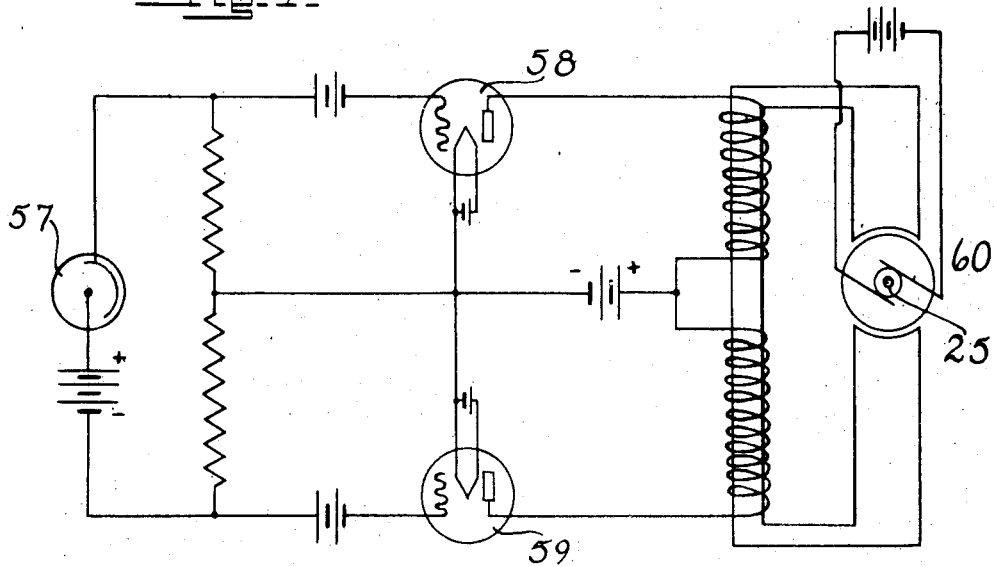
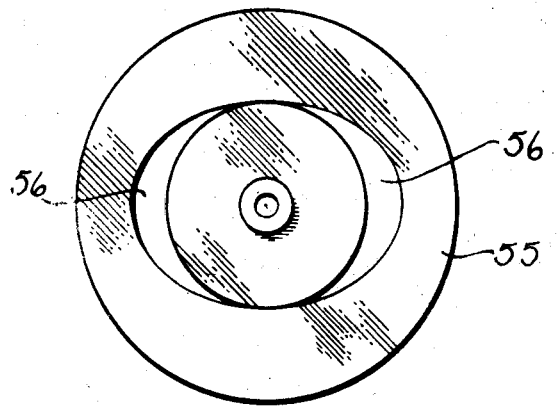
Inventor
Fordyce Tuttle
By Newton M. Perkins
Attorney Patented Dec. 15, 1931

1,836,691

UNITED STATES PATENT OFFICE

FORDYCE TUTTLE, OF ROCHESTER, NEW YORK, ASSIGNOR TO EASTMAN KODAK COMPANY, OF ROCHESTER, NEW YORK, A CORPORATION OF NEW YORK

MEANS FOR MAINTAINING MOVING BANDS IN SYNCHRONISM

Application filed September 3, 1929. Serial No. 390,102.

This invention relates to a method and apparatus for maintaining synchronism between moving bands such as motion picture film.

In the making of a print on a moving band from a moving record such as in the case of preparing a photographic positive from a sound negative it is especially important that the two records be maintained in synchronism so that when the pictures and sound record printed on the same positive film are reproduced, they will be in synchronism one with respect to the other. It is known that the processing of a negative or photographic record tends to cause shrinkage which may amount to as much as ten or more feet in each thousand feet of the film, while the positive is made on "raw" or unprocessed stock, the length of which can be closely regulated. Such a condition presents a real problem in maintaining the desired synchronism in the printing operation if the negative is printed without reference to the sprocket holes.

In accordance with the present invention a novel method of preserving synchronism between a processed negative and an unprocessed positive is provided in which the negative, independent of the positive, effects the desired control. A further feature of the invention includes novel equipment whereby synchronism may be maintained between the positive and negative records or films by mechanism controlled from the negative alone.

For a clearer understanding of the invention reference is made to the drawings in which Fig. 1 is a diagrammatic showing of the important parts of a device suitable for printing a positive record or film from a negative film; Fig. 2 is a plan view of a shutter shown in elevation in Fig. 1 while Fig. 3 is a diagrammatic showing of a motor unit including an induction motor and associated manual speed control equipment for use in connection with the device of Fig. 1; Fig. 4 is one form for marking time intervals on a negative film for controlling the equipment of Figs. 1 and 2, and Fig. 4A is an enlarged view of a portion of the film of Fig. 4 indicating the movement of the film past the slit during the open period of the shutter; Fig. 5 is a modified form of negative or record in which the perforations normally present in the film are used to mark time intervals while Fig. 5A is an enlarged view of a portion of the film of Fig. 5 showing one perforation and the movement of the film during the period that the shutter is open; Fig. 6 is a graph representing the photoelectric current plotted with time as an abscissa; Fig. 7 shows the circuits of a photoelectric cell and an associated vacuum tube amplifier linked to the field of an automatic speed-controlling motor; and Fig. 8 is a plan view of a shutter for use in the automatic speed controlling arrangement which shutter replaces that shown in Figs. 1 and 2.

Referring especially to Fig. 1 there is shown a portion of a projection printer, which may be of any well-known type, including a source of light 10, gate mechanism 11 and a condensing lens 12 for illuminating the aperture 13 in the gate elements. The negative film 14 is pulled by the driven reel 15 between the two elements of the gate 11 as fast as it is advanced through the speed controlling unit including a series of rolls 16 and driven roll 17, from the supply reel 18. The positive film 23 similarly passes from supply reel 21 between the two elements 19 of well-known gate mechanism provided with aperture 20 and is driven by sprocket wheel 22 engaging the perforations in the film to advance it to a take-up reel 24. In accordance with the usual practice there is interposed a projection lens system 25' in the optical path of the rays from light source 10 passing through the apertures 13 and 20.

It is well-known that when negative film has been printed and processed considerable shrinkage takes place which is frequently as much as ten or more feet in each thousand feet while the positive is printed on film that has not been subject to this shrinkage. In the printing of positive photographic records from negatives such as the preparation of positive sound films, it is essential that the positive record be in approximately exact synchronism frame by frame with the negative and since the positive record is printed on raw stock the dimensions of which can be closely regulated and since the dimensions of the negative are determined by shrinkage which is frequently non-uniform, some accurate synchronizing means must be provided. If, however, it is attempted to maintain the negative in synchronism with the positive by driven sprockets engaging the perforations of these films there will be a tendency for the negative to fit too tightly or too loosely on the sprocket teeth thereby causing an irregular motion of the film which may result in the loss of an infinitesimal portion of the sound record and the consequent distortion in the reproduced sound. It is therefore proposed to employ friction roll drive for the negative film 14 as shown at 16 and 17 wherein the roll 17 is mounted on drive shaft 25 which may be an extension of the shaft of an induction type motor 46 shown in Fig. 3. This induction motor is a part of a motor unit which has been fully disclosed in a paper "An electrical synchronizing system" in The Transactions of Society of Motion Picture Engineers, Vol. XII, No. 35, beginning on page 778. This unit comprises an induction motor generally designated 46 having its rotor 47 energized from a source of single phase alternating current while the stator is represented by the elements 48, each energized from a different phase of three-phase alternating current. The speed controlling motor 43 associated with the driving motor 46 and forming a part of the unit is likewise provided with a rotor 49 energized in parallel with the rotor 47 from the single phase alternating current source while the stator comprises elements 50, each energized from different phase of the three-phase alternating current source. It is unnecessary to describe the theory of this motor unit but it is sufficient to state that while the handle 51 is being moved in one direction thereby changing the relation of the rotor 49 with respect to the stator elements 50 the speed of the motor 46 is increased and while the handle of the motor 51 is being moved in the opposite direction changing the relation of rotor 49 to stator units 50 in the opposite manner, the speed of the motor 46 is decreased. The operator by ascertaining the reading on the meter 37 is informed of the need for accelerating or retarding the speed of the motor 46 so that the speed of the driving drum 17 may be regulated at will in any way desired.

For the purpose of indicating synchronism between the positive and negative films the negative film 14 such as shown in Fig. 4 and in enlarged detail in Fig. 4A has printed thereon a photographic record 26 corresponding to a constant wave length as measured by the perforation pitch. This record is printed on the negative at the same time that the sound record 27 is printed thereon and has a definite relation with respect to it.

In order to effect synchronism between the two films a shutter 28 having an aperture 29 in the form of a sector as shown in Fig. 2, is arranged to be rotated by shaft 30 and beveled gears 31 driven from the same source as sprocket wheel 22 so that it has a predetermined time relation with respect to this sprocket wheel. Shutter 28 is mounted to rotate in front of a diaphragm 32 having a slit 33 illuminated from a source of light 34 while a photoelectric cell 35 is mounted in such position that it is illuminated by light from source 34 when the slit 33 and the opening 29 of the diaphragm and shutter are in registry. This photoelectric cell is connected electrically into circuits including an amplifier 36 of the vacuum tube type, the output of which includes an electrical meter 37 so that the operator observing the reading on the meter 37 may manually retard or accelerate the rotation of the motor 46 and shaft 25 which it drives to govern the speed of driving roll 17 and thereby maintain the proper relation between the negative and positive films.

The control of the synchronism of these two films by means of the photoelectric cell may best be understood by reference to Fig. 4A wherein it is represented that if the negative is advanced a predetermined distance in a given interval of time the opening 29 will register with the slit in the diaphragm at the portion of the curve designated 38 in this figure. This is assumed to be the condition when the film is being advanced in proper synchronism with the positive wherein the photoelectric current is represented in full lines in the graph of Fig. 6. However, if the negative film gets out of synchronism with the positive so that the shutter opening registers with the slit in the diaphragm at a point such as 39 near the crest of the wave, the photoelectric current will have a magnitude represented by the point 40 on the photoelectric current graph of Fig. 6 so that the reading on the indicator 37 will be of small magnitude. However, if the movement of the negative film is such that the openings in the diaphragm and shutter are in registry at a point on the wave such as 41 the magnitude of the photoelectric current will be increased to an amount indicated by the point 42 on the graph of Fig. 6. This will result in the meter 37 showing a greater reading which will be an indication to the operator to accelerate the induction motor by the hand operated control motor 43.

Instead of printing an alternating current wave on the negative such as shown in Fig. 4 it is possible as shown by the modification in Fig. 5 to employ the series of perforations on one margin of the negative film to mark proper time intervals in which case a strip 44, formed by fogging one edge of the negative including the series of perforations, is utilized to effect control in substantially the same manner as shown in Fig. 4. By reference to Fig. 5A it will be seen by noting the relation between the perforation 45 and the movement of the film during the period that the shutter is open, which is represented by the dotted rectangle 46, that the variation of the photoelectric current as indicated by meter 37 is controlled by the relation between the period of registry between the shutter opening and the perforation 45. If the registry of the perforation and the slit is as shown in Fig. 5, a condition which is assumed to show substantially exact synchronism, the photoelectric current will be represented by the curve shown in full lines in Fig. 6. However, if the dotted rectangle is moved to the left showing a very small registry between the perforation and the slit in the diaphragm the photoelectric current will have a magnitude not exceeding the point indicated at 40 in Fig. 6. On the other hand if the dotted rectangle is moved to the right so that it substantially registers with the perforation 45, a maximum photoelectric current results which is indicated in dotted lines extending to the point 42. Since the meter 37 reads corresponding to the graph 47, the operator has a visual indication by means of which the speed of the negative may be accelerated or retarded.

Instead of using the manual control of synchronism as disclosed in the foregoing description it is possible to employ full automatic means for controlling the synchronism between the moving bands by substituting the shutter 55 of Fig. 8 for the shutter 28 of Fig. 1 and by replacing the photoelectric cell 35 and the amplifier 36 together with the meter 37 of Fig. 1 by the electrical arrangement shown in Fig. 7. The shutter 55 has two openings 56 so designed that when rotated at the proper speed they will define a light and shade pattern similar to that shown at 26 in Fig. 4. When the shutter 58 is thus rotated in front of the diaphragm 32 radiations from the source 34 will intermittently pass through the openings 56 in the shutter, the slit 33 and negative 14 after which they fall on the photoelectric cell 57 of Fig. 7. These radiations are effective under the influence of the record 26 on the negative 14 as shown in Fig. 4, to effect control in the same manner as described in connection with Figs. 4A and 5A. This radiation flux applied to the photoelectric cell 57 develops a varying photoelectric current which is introduced into a well-known push-pull circuit network including vacuum tube relays 58 and 59 of a type which has a large plate current. The output circuit of these push-pull amplifying tubes 58 and 59 includes the field windings of a direct current shunt wound motor generally designated 60 which increases its speed with an increase in field strength and decreases its speed when the field strength is decreased. In this way the variations in the photoelectric current, due to the lack of synchronism, causes an increasing or decreasing current in the field windings of the motor and thereby accelerates or retards the speed of the motor 60, the shaft 25 of which drives the drum 25 to control the linear velocity of the negative film 14.

The present disclosure shows the preferred forms of manual and automatic control of the synchronism between negative and positive film but these arrangements are capable of many variations and modifications without departing from the present invention except as specifically defined by the following claims.

What I claim is:

1. The method of maintaining moving positive and negative films in synchronism which comprises providing the negative film with a series of alternate radiation transmitting areas and radiation retarding areas, moving both of said films, transmitting radiations through said negative film alone in synchronism with the movement of said positive film, and employing the variable transmitted radiation flux for indicating the needed variation in speed of movement of one of said films.

2. The method of maintaining moving positive and negative films in synchronism which comprises providing the negative film with a series of alternate radiation transmitting areas and radiation retarding areas, moving both of said films, intermittently transmitting rediations through said negative film alone in synchronism with the movement of said positive film, and employing the variable transmitted radiation flux for controlling the speed of movement of one of said films.

3. The method of maintaining moving positive and negative films in synchronism which comprises providing the negative film with a series of alternate radiation transmitting areas and radiation retarding areas, moving both of said films, transmitting radiations through said negative film alone in synchronism with the movement of said positive film, translating the variable transmitted radiation flux into an electric current, and employing said electric current to control the speed of movement of one of said films.

4. The method of maintaining moving positive and negative films in synchronism which comprises providing the negative film with a series of alternate radiation transmitting areas and radiation retarding areas, moving both of said films, intermittently transmitting radiations through said negative film alone in synchronism with the movement of said positive film, translating the variable transmitted radiation flux into photoelectric current, amplifying said photoelectric current, and employing said amplified photoelectric current to control the speed of movement of one of said films.

5. The method of maintaining frame by frame synchronism between two moving photographic films one of which films is provided with a photographic record and also with radiation transmitting areas and radiation retarding areas arranged according to a definite time relation, which comprises moving both of said films, transmitting radiations through said radiation transmitting areas of said film alone in synchronism with the frame by frame movement of said second film, and employing the variably transmitted radiation flux for controlling the speed and movement of one of said films.

6. The method of maintaining moving perforated positive and negative films in synchronism which comprises applying a radiation absorbing layer surrounding a series of perforations on the negative film, transmitting radiations through said series of perforations in the negative film in synchronism with the movement of said positive film, and employing the variable transmitted radiation flux for controlling the speed of movement of one of said films.

7. The method of obtaining frame by frame synchronism between two photographic films at least one of which is provided with perforations and the second is provided with periodically recurring radiation transmitting areas which comprises moving the first of said films by sprocket drive, moving the second film by friction roll drive, transmitting radiations through said periodically recurring transmitting areas but not through said first film in synchronism with the movement of said first film, and employing the variable radiation flux for controlling the speed of movement of said second film.

8. In a printing device, gate elements through which positive and negative films may be advanced, a diaphragm having an opening therein, a shutter movable past said opening, a source of radiations at one side of said diaphragm, a photoelectric cell in the optical path of radiations from said source through said diaphragm, said shutter and said negative film, separate driving means for each of said films, said shutter being operated in synchronism with one of said driving means, means on said negative film for varying the radiations passing therethrough and means including said photoelectric cell for controlling the speed of said other driving means.

9. In a printing device, gate elements through which positive and negative films may be advanced, a diaphragm having an opening therein, a shutter movable past said opening, a source of radiations at one side of said diaphragm, a photoelectric cell in the optical path of radiations from said source through said diaphragm and said shutter, separate driving means for each of said films, said shutter being operated in synchronism with one of said driving means, means on said negative film for varying the radiations passing therethrough and means including a vacuum tube amplifier and said photoelectric cell for controlling the speed of the other driving means.

10. In a printing device, gate elements through which positive and negative films may be advanced, a diaphragm having an opening therein, a shutter movable past said opening, a source of radiations at one side of said diaphragm, a photoelectric cell in the optical path of radiations from said source through said diaphragm said shutter and one of said films, separate driving means for each of said films, said shutter being operated in synchronism with one of said driving means, and means including vacuum tubes connected in "push-pull" arrangement and said photoelectric cell for controlling the speed of said other driving means.

11. In a printing device, gate elements through which positive and negative film may be advanced, a diaphragm having an opening therein, a shutter movable past said opening, a source of radiations at one side of said diaphragm, a photoelectric cell in the optical path of radiations from said source through said diaphragm and said shutter and one of said films, means for driving one of said films and said shutter, means including a shunt wound motor for driving the other of said films, and means including said photoelectric cell for varying the field strength of said shunt wound motor to control the speed thereof.

12. A printing device comprising, in combination, an independently driven first film, driving means for a second film, a series of alternate radiation transmitting areas upon said first film adapted to intercept a beam of light and means responsive to the intercepted beam of light for controlling the driving means for said second film.

13. Apparatus for advancing two films in complete synchronism comprising, in combination, means for periodically transmitting and intercepting a beam of radiant energy at a rate corresponding to the speed of a moving first film, driving means for a second film, and speed controlling means responsive to the interrupted beam of radiant energy and associated with said driving means for maintaining said second film in synchronism with said first film.

14. Apparatus for advancing two films in complete synchronism, comprising, in combination, means for periodically varying a beam of radiant energy at a rate corresponding to the speed of a moving first film, driving means for a second film and means associated with said driving means for controlling the speed of the second film in accordance with the variations in said beam of radiant energy.

15. Apparatus for advancing two films in complete synchronism, comprising, in combination, an independently driven first film, driving means for a second film, a source for transmitting radiations through said first film, means for intercepting said transmitted radiations with a periodicity corresponding to the speed of said first film, and means responsive to said transmitted radiations for controlling the driving means for said second film.

Signed at Rochester, New York, this 28th day of August 1929.

FORDYCE TUTTLE.